United States Patent [19]
Collins

[11] Patent Number: 5,956,254
[45] Date of Patent: Sep. 21, 1999

[54] OCTANE SENSITIVE DISPENSER BLENDING SYSTEM

[75] Inventor: J. Randall Collins, Punta Gorda, Fla.

[73] Assignee: Tokheim Corporation, Fort Wayne, Ind.

[21] Appl. No.: 08/921,117

[22] Filed: Aug. 29, 1997

Related U.S. Application Data

[60] Provisional application No. 60/028,220, Oct. 10, 1996.

[51] Int. Cl.$^6$ .............................. G06F 17/00; G06F 7/00; B67B 7/00; B67D 5/08
[52] U.S. Cl. .................................. 364/479.09; 364/479.1; 364/479.12; 364/479.14; 222/1; 222/52; 222/56
[58] Field of Search ........................... 364/479.09, 479.1, 364/479.11, 479.12, 479.14, 479.02, 479.03, 479.01, 479.06, 479.08; 222/144.5, 63, 57, 71, 52, 56, 1; 73/861.02, 861.04, 861.07

[56] References Cited

U.S. PATENT DOCUMENTS

| | | |
|---|---|---|
| 3,751,644 | 8/1973 | Mayer . |
| 3,999,959 | 12/1976 | Bajek . |
| 4,251,870 | 2/1981 | Jaffe ........................................ 364/500 |
| 4,353,482 | 10/1982 | Tomlinson et al. ................. 364/479.09 |
| 4,568,248 | 2/1986 | Harders . |
| 4,876,653 | 10/1989 | McSpadden et al. .............. 364/479.09 |
| 4,976,851 | 12/1990 | Tanokura et al. ........................... 222/52 |
| 5,029,100 | 7/1991 | Young et al. ....................... 364/479.09 |
| 5,038,971 | 8/1991 | Gayer et al. ................................. 222/1 |
| 5,125,533 | 6/1992 | Gayer et al. ............................... 222/28 |
| 5,139,045 | 8/1992 | Ensign ..................................... 137/114 |
| 5,163,586 | 11/1992 | Zinsmeyer . |
| 5,225,679 | 7/1993 | Clarke et al. ........................... 250/343 |
| 5,240,324 | 8/1993 | Phillips et al. ..................... 364/479.09 |
| 5,275,189 | 1/1994 | Ensign ......................................... 137/3 |
| 5,330,073 | 7/1994 | Collins et al. ............................. 222/52 |
| 5,630,528 | 5/1997 | Nanaji ......................................... 222/1 |
| 5,757,664 | 5/1998 | Rogers et al. ...................... 364/479.02 |
| 5,801,951 | 9/1998 | Burns, II et al. .................. 364/479.09 |

Primary Examiner—William E. Terrell
Assistant Examiner—Wonki K. Park
Attorney, Agent, or Firm—Randall J. Knuth

[57] ABSTRACT

An octane sensitive blending dispenser for fluids, particularly for fuel dispensers. The dispenser controls component pumps according to octane data measured by octane meters. In one form of the invention octane measurements are taken within the input lines connected to the dispenser from fluid storage tanks. Control of the component pumps is accomplished by determining the difference between the desired blend octane and the observed blend octane and adjusting the pumps so as to more closely blend the desired fluid.

13 Claims, 2 Drawing Sheets

OCTANE SENSITIVE DISPENSER BLENDING SYSTEM

This application claims benefit of provisional application 60/028,220 filed Oct. 10, 1996.

BACKGROUND OF THE INVENTION

1. Field of the Invention

The field of the invention is that of blending dispensers for liquids. More particularly, the field is that of blending dispensers capable of dispensing a variety of different octane fuels.

2. Description of the Related Art

In liquid dispensing devices, for example gasoline fuel pumps, different grades of gasolines are conventionally mixed to provide a specific blend. Using two gasoline sources, one supply tank containing gasoline having a first octane rating, for instance, 95, and the other supply tank containing gasoline having another octane rating, for instance, 83, conventional dispensers produce gasoline blends having a desired octane rating in the range of 83 to 95 by measuring the volume of each octane being dispensed and adjusting accordingly.

The following example uses 83 and 95 octane gasolines as the component fuels because they represent a common prior art range of octanes; however, a variety of ranges of octanes have been used to mix and provide blends of gasoline. For example, gasolines of various octane ratings can be provided by mixing component gasolines in the following percentages:

| Octane | % of 83 Octane | % of 95 Octane |
|--------|----------------|----------------|
| 83     | 100            | 0              |
| 87     | 67             | 33             |
| 89     | 50             | 50             |
| 91     | 33             | 67             |
| 95     | 0              | 100            |

In prior art systems, such as U.S. Pat. No. 4,876,653, issued to McSpadden, a proportional control system has been used to check the blending ratio periodically by observing the instantaneous flow rates of the two component streams of fluid (e.g. from the 83 and 95 octane tanks). An electronic controller observes the instantaneous flow rates by receiving signals from flow meters in the two flow lines. When the instantaneous flow rates substantially deviate from those needed to provide the desired mixture, the valves which control the component streams are adjusted accordingly. This results in a dispenser which tends to deliver an instantaneous blend ratio equal to the desired mixture only after a significant portion of the desired quantity of fuel has been dispensed, assuming that liquid pressure remains relatively constant. Thus a significant quantity of the dispensed fuel may have an incorrect blend or mixture. However, such proportional control systems only correct for errors in the instantaneous flow rate and do not account for errors in the fuel which has already been dispensed so that the total amount of dispensed fuel will be a desired blend. Moreover, such systems are dependent on having components stocks which are of the correct octane. If the stock fluids are not of the correct octane, which is often the case, the resulting mix will be correspondingly incorrect.

More recent prior art, such as U.S. Pat. Nos. 5,038,971 and 5,125,533, both assigned to the present assignee, greatly improve on this concept by measuring the flow rates of two component streams and using a proportional-integral-differential (PID) control algorithm. The PID control algorithm lessens the amount of deviation from the desired ratio, and results in a blend closer to the actual desired octane. However, such a system still assumes the component fuels possess their claimed octane, and the octanes of each component fuel are not actually measured but rather the volume of each component fuel is adjusted if the flow rates diverge past certain parameters.

SUMMARY OF THE INVENTION

The present invention is an octane sensitive dispenser blending system which continuously measures the octane of the component fuels and adjusts the flow rates of the component fuels in order to reach the desired final octane. During each dispensing session, the flow rates of each component fuel are continuously corrected based on signals received from octane sensors stationed directly in the fluid stream. The correction required is performed by having a microprocessor compare the user-selected, desired octane to the actual octane being dispensed and adjusting the component flow rates accordingly.

The present invention utilizes two component fuel tanks, wherein one fuel tank contains fuel of relatively low octane, and the other tank contains fuel of relatively high octane. In the exemplary embodiment, as the fuel is dispensed from each of the fuel tanks, separate octane meters measure the actual octane of each component fuel as they are dispensed. These octane meters in turn send electric signals to a processing unit which compares the actual octanes being combined to the octane selected by the user. Based on calculations using both the actual octane being dispensed and the octane selected by the user, the processing unit will then send a signal to the pumps controlling each dispensing tank. These pumps then adjust the flow rate of each component fuel based on the signals received from the processing unit and the resulting blend will be fed to a nozzle or other dispensing device.

In the present invention, only two supply tanks are needed to provide a variety of blends ranging from the octane ratings of the low octane fuel to high octane fuel. Thus a fuel dispensing station needs only two supply tanks to provide a variety of octane blends, rather than one tank for each octane blend dispensed which would add to the cost of the station. Also, because of the expense involved in monitoring the supply tanks for environmental reasons, the cost of maintaining the installation is lowered by accurately and individually measuring the amount of fuel, such as gasoline, supplied by each tank. Requiring only two tanks for numerous blends lowers the cost necessary to build a gasoline dispensing installation and lowers maintenance costs as well. Also, the present invention is adaptable to a variety of sizes of installations, from one dispenser and two small tanks to a multiplicity of dispensers and two or more large tanks.

One advantage of the present invention is that it provides a dispenser which measures the octane of each component fuel as it is dispensed to provide more accurate octane data to the processing unit.

Another advantage of the present invention is that it provides a dispenser which calculates pump flow rate adjustments according to the actual octane of the component fuels dispensed, and the octane selected by the user, to eliminate the need to combine more of the higher octane fuel to ensure the resulting blend has a sufficiently high octane.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout both views. The exemplifications set out herein illustrate two embodiments of the invention and such exemplifications are not to be construed as limiting the scope of the invention in any manner.

DETAILED DESCRIPTION OF THE INVENTION

Figure 1:
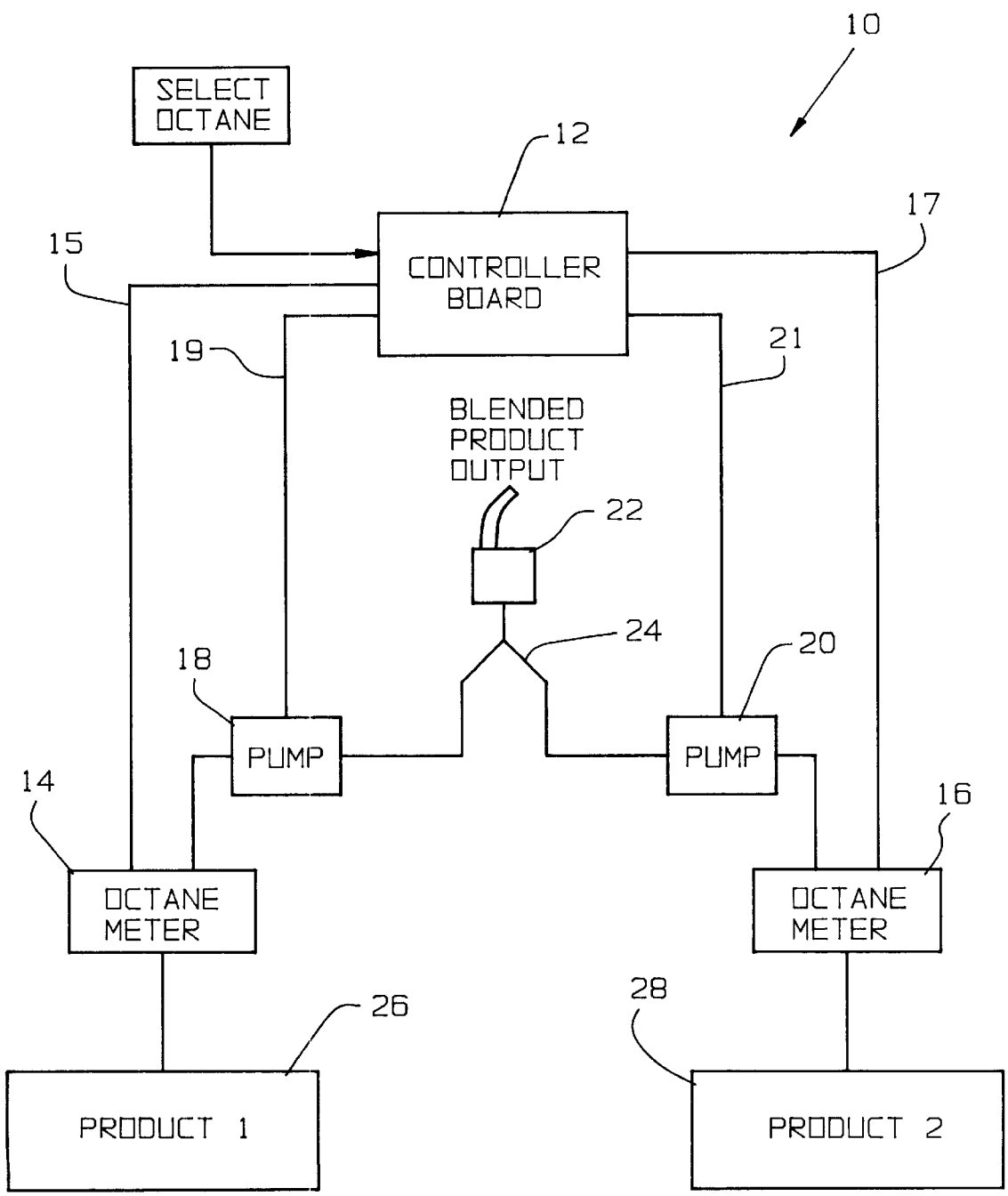
FIG. 1 is a schematic diagram of the octane sensitive blending dispenser of the exemplary embodiment of the present invention.

As shown in FIG. 1, the exemplary embodiment of the present invention is generally depicted as dispenser unit 10. Controller board 12 receives signals from octane meters 14 and 16 and operates variable pumps 18 and 20. Nozzle 22, via Y connection 24, receives the output of variable pumps 18 and 20, and mixes and dispenses the component fuels. Variable pump 18 receives fuel from supply tank 26, with meter 14 monitoring the octane of the fuel supplied to variable pump 18. Octane meter 14 is coupled to controller board 12 by line 15 and sends signals through line 15 to board 12 which represent the octane of the fuel flowing through pump 18.

Similarly, supply tank 28 provides fuel to variable pump 20, with octane meter 16 measuring the octane of the fuel flowing through pump 20 and electronically transmitting that octane measurement data to controller board 12 via line 17. Pumps 18 and 20 receive control signals from controller board 12 via control lines 19 and 21, respectfully. Alternately, the functions of pumps 18 and 20 can be combined in a single pump in which one passageway opens while the other closes.

Figure 2:
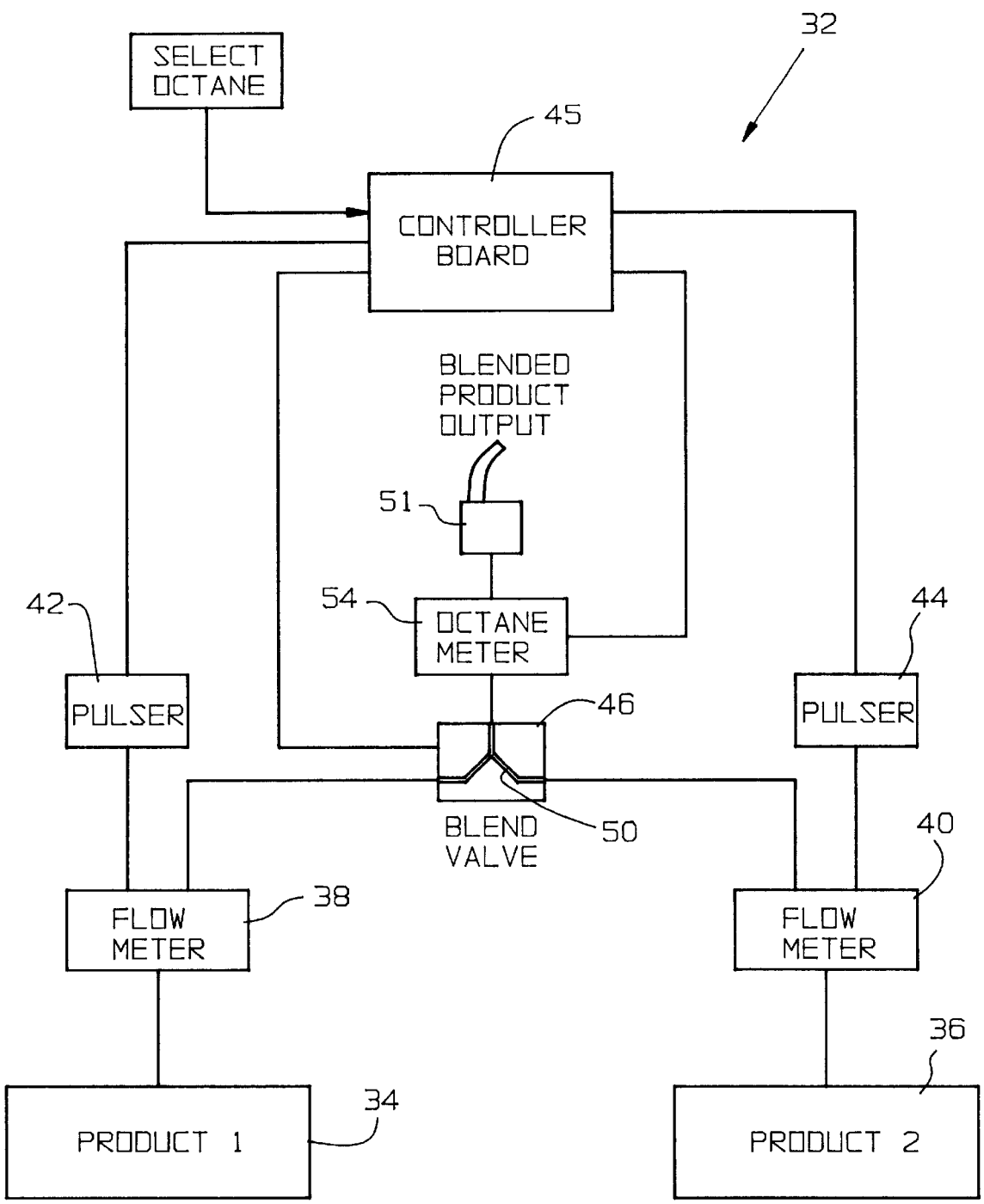
FIG. 2 is a schematic diagram of an alternate embodiment of the present invention.

An alternative embodiment of the present invention is shown in FIG. 2. Dispenser unit 32 has two sets of supply tanks, flow meters, pulsers, and valves coupled to an output nozzle. Specifically, supply tanks 34 and 36 are coupled to flow meters 38 and 40, respectively. For purposes of this example, supply possible octane sensing technology may be used include near infrared, infrared, mass spectrometry, or optical transmission detection of trace compounds, markers or dyes. tank 34 contains low octane (Product 1, e.g. 83 octane) and supply tank 36 contains a high octane gasoline (Product 2, e.g. 95 octane). Flow meter 38 and 40, which in the preferred embodiment are positive displacement meters such as piston meters, measure the volume of gasoline supplied by its respective supply tank, and are coupled to pulsers 42 and 44, respectively. To keep a tally of the volume of gasoline measured by the respective meters, registers within controller board 45 count pulses received from pulsers 42 and 44 attached to meters 38 and 40. Each pulse represents a predetermined amount of fuel. Blend valve 46 serves as the conduit between supply tanks 34 and 36, respectively, incorporating a Y connection 50 to provide nozzle 51 with appropriate volumes of component gasolines. Between nozzle 51 and blend valve 46 is disposed an octane meter 54 for measuring the octane out of the output gasoline blend. Octane meter 54 sends a signal to controller 45 dependent on the measured octane of the output blend.

A microprocessor (not shown) within controller board 45 is electrically coupled to pulsers 42 and 44. Based on the octane selected by the user, the measured octane data from meter 54, and the flow rates of the component fuels, the microprocessor will calculate adjustments in the two flow rates and send signals to valve 46 to adjust the flows accordingly.

In the exemplary embodiment, the dispensing of fuel will begin when a user selects an octane to be dispensed. The selected octane will be entered on a input panel (not shown) which in turn will transmit an electric signal to controller board 12. Controller board 12 will calculate the amount of product 1, contained in tank 26, and product 2, contained in tank 28, which should be combined to result in a fuel having an octane corresponding to the octane selected by the user. To ensure that the resulting octane ultimately fed through nozzle 22 is of the octane selected by the user, octane meters 14 and 16 will continuously measure the octane of the fuels being dispensed from tank 26 and tank 28, respectively. This octane data will be transmitted to controller board 12 which will continually make calculations depending on the variations of the octanes being dispensed from tanks 26 and 28 and will adjust the flow rates of the two components to result in the desired octane. Controller board 12 will adjust the flow rates of the two components by sending electric signals to pumps 18 and 20 to correspondingly adjust the flow rates of each pump.

In the alternative embodiment, the dispensing of fuel will also commence when a user selects an octane through the input panel (not shown). This selected octane data will be fed to controller board 45 which will in turn transmit electric signals to begin dispensing of product 1 from tank 34, and product 2 from tank 36. As the component fuels are dispensed, flow meters 38 and 40 will monitor the volume of the component fuels being dispensed by tanks 34 and 36, respectively, and through pulsers 42 and 44 will transmit electric signals back to controller board 45. If the flow rates of the two components are not sufficient to result in the desired selected final octane, the microprocessor will adjust the flow rates accordingly by sending appropriate signals to blend valve 46. Finally, the alternative embodiment uses octane meter 54 to monitor the octane of the fuel being dispensed from blend valve 46. This octane data is transmitted to controller board 45 which will adjust the flow rate through blend valve 46 if necessary.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A dispenser for blending component fluids to achieve a desired octane for the blended product, said dispenser comprising:

a plurality of fluid conduits, each said fluid conduit coupled to one of at least two supplies of component fluid to be dispensed therefrom;

a pump means coupled to each said fluid conduit for controlling the flow rate at which each said component fluid flows through said respective fluid conduits;

octane sensors operatively associated with said fluid conduits for measuring the octane of said component fluid flowing through each said fluid conduit and for providing an octane signal representative of said octane;

an output means coupled to each said fluid conduit for mixing and dispensing said component fluids; and control means for controlling the blending and dispensing of said component fluids, said control means coupled to said octane sensors means and said pump means, said control means including selecting means for selection of said desired octane blend and comparison means for comparing a calculated octane with said desired octane and for determining a corrected blend ratio, said control means further including adjustment means for adjusting said pump means in accordance with said corrected blend ratio such that the actual octane of dispensed blended fluids is substantially equal to said desired octane.

2. The dispenser according to claim 1 wherein said supplies of said component fluids comprise a low octane fuel supply and a high octane fuel supply.

3. The dispenser according to claim 1 wherein said octane sensor includes a glass electrode to measure fluid octane.

4. The dispenser according to claim 1 wherein said output means comprises a standard fuel dispensing nozzle.

5. The dispenser according to claim 1 wherein said control means includes a calculating means for determining said calculated octane by adding the octane signals together and dividing by the total number of octane signals received from said octane meters.

6. The dispenser according to claim 1 wherein said pump means are capable of full fluid shut-off.

7. The dispenser according to claim 1 wherein said control means comprises a microprocessor.

8. A method of blending a plurality of component fluids to provide a blended product having a predetermined octane, said method comprising:

providing a blending dispenser including at least two conduits for supplying at least two component fluids to said dispenser, at least two octane meters connected to said conduits for measuring the octane of each said respective supplied component fluid, and pump means for controlling the respective supply flow rate of each said component fluid;

activating said pump means to initiate a flow of said component fluids in a ratio to achieve the predetermined octane in the blended product to initiate a dispensing operation;

measuring the octane of each said component fluid dispensed by said dispenser to provide octane measurements;

calculating a calculated octane of said dispensed component fluids from said octane measurements;

comparing said calculated octane with said predetermined octane to determine dispensing error; and adjusting said pump means if said dispensing error is outside a predetermined range.

9. In a fuel dispensing installation, a system for mixing and blending component fuels to provide a desired blend octane, said system comprising:

an output means for mixing and dispensing said component fuels;

a plurality of variable supply means for providing one of said component fuels to said nozzle means, at least one said variable supply means for each said component fuel, said variable supply means for controlling component fuel flow;

an octane meter means operatively associated with each said variable supply means for measuring the octane of said component fuel flow through said variable supply means and for producing octane signals representative of the octane of said component fuel flow; and a control means for controlling the blending and dispensing of said component fuels, said control means coupled to each said octane meter means and each said variable supply means, said control means including comparison means for comparing a calculated octane with said desired blend octane and for determining a corrected blend ratio, said control means including a selection means for selection of said desired cumulative blend ratio, said control means further including adjustment means for adjusting said variable supply means in accordance with said corrected blend ratio such that the actual blend octane of such dispensed component fuels is substantially equal to said desired blend octane.

10. The dispenser according to claim 1, wherein said octane sensors comprises near infrared.

11. The dispenser according to claim 1, wherein said octane sensors comprises infrared.

12. The dispenser according to claim 1, wherein said octane sensors comprises mass spectrometry.

13. The dispenser according to claim 1, wherein said octane sensor comprises optical transmission detection of trace compounds.

* * * * *

UNITED STATES PATENT AND TRADEMARK OFFICE
CERTIFICATE OF CORRECTION

PATENT NO. : 5,967,254
DATED : Oct. 19, 1999
INVENTOR(S) : LUTZER

It is certified that error appears in the above-identified patent and that said Letters Patent is hereby corrected as shown below:

Col. 5, line 3, after "discussed", replace "farther" by --further--;
line 11, after "other", replace "band" by --hand--;
line 20, after "and", delete "sec-";
line 21, before "of", replace "toring" by --securing--;
line 27, after "slide", replace "Support" by --support--;
line 28, after "the", replace "Lower" by --lower--.

Signed and Sealed this

Fourteenth Day of March, 2000

Attest:

Q. TODD DICKINSON

Attesting Officer

Commissioner of Patents and Trademarks